Patented Oct. 26, 1943

2,332,758

UNITED STATES PATENT OFFICE 2,332,758

METHOD OF MAKING STARCH CONVERSION PRODUCTS

Herman H. Schopmeyer, Hammond, Ind., and Abraham H. Goodman, Chicago, Ill., assignors to American Maize-Products Company, a corporation of Maine No Drawing. Application May 28, 1941, Serial No. 395,566

6 Claims. (Cl. 127—40)

This invention relates to the method of making starch conversion products of abnormally low ash content.

Such products are useful particularly as crystallized dextrose, as clarified syrup of low content of inorganic salts, and as "70 sugar" for the tanning and brewing industries. The invention will be illustrated, therefore, by description in detail in connection with making these materials.

In producing starch conversion products by the conventional methods, a suspension of starch in water containing acid is heated to convert the starch largely to soluble products in the form of starch conversion liquor. Hydrochloric acid is ordinarily the acid selected for effecting conversion. After the conversion, the acidity is neutralized with an alkali, such as sodium carbonate, and the neutralized liquor then refined by a process including evaporation to produce a concentrated syrup.

In this method, sodium chloride or like water-soluble substance results from the neutralization. The substance appears as ash in a product made by solidifying the concentrated syrup. It appears partly as ash in crystallized dextrose and to a very large extent in the mother liquor or hydrol from the crystallization of dextrose, in case the neutralized syrup is utilized in the production of dextrose.

There are serious disadvantages in the presence of large amounts of dissolved inorganic salts in the products of the conversion of starch. In the manufacture of dextrose, for example, the ash retards the crystallization and decreases the purity and yield of the dextrose finally obtained. A high ash content also introduces difficulties in the reconversion of molasses separated from the dextrose crystals.

In attempts to minimize the difficulties due to ash, it has been proposed to use sulfuric acid, as the acid for conversion, and neutralize the acid after conversion with an alkali, such as lime, that produces a relatively insoluble precipitate of the added inorganic ash-forming materials that may be separated by settling and filtration.

Calcium sulfate has an appreciable solubility, however, and discouraging difficulties have been encountered in the attempted use of sulfuric acid and lime for converting and neutralizing as described. Thus, the portion of the calcium sulfate which remains in solution and is not separated by filtration forms scale in the evaporators used in concentrating the starch conversion liquor and also appears in part in the finished starch conversion products. As a result, the use of the sulfuric acid and lime process has not been widely adapted in the corn starch refining industry and has been used in a limited way only in making certain special products.

We have now discovered a method that eliminates the difficulties due to scaling on evaporation of the starch conversion liquors and due to calcium sulfate appearing in the final products in objectionable amount and that makes possible the convenient production of a solidified starch conversion product that has an ash content of approximately one-fifth to one-tenth of the ash content of the corresponding product as made conventionally. As applied to the manufacture of dextrose, our method makes possible the crystallization of the dextrose in a maximum of about 7 days time, even for the third sugar crystallization, as against 23 to 30 days normally, and with a yield that is substantially greater than the yield obtained by the usual process including hydrochloric acid conversion and sodium carbonate neutralization.

Briefly stated, our invention comprises converting a suspension of starch in water containing dissolved sulfuric acid as the acid for effecting the conversion, mixing into the resulting starch conversion liquid an adsorbent such as bentonite or like material adapted to neutralize electrical charges on particles in the starch conversion liquid or otherwise cause adsorption or coagulation of colloidal materials that if not removed would be subject to objectionable decomposition as the syrup is heated and evaporated and the concentration of sulfuric acid is increased, separating the adsorbent and adsorbed materials so as to produce a clarified liquor, evaporating the clarified liquor to a concentrated syrup without the addition of lime or other alkali, then adding lime to coagulate certain materials and precipitate sulfuric acid as calcium sulfate, separating the precipitated calcium sulfate and coagulated materials, and cooling the resulting clarified syrup to form a starch conversion product of low ash content, as by the solidification of the syrup in toto or by the formation of crystals of dextrose as the syrup is cooled slowly. In the preferred embodiment the invention comprises separating the precipitated calcium sulfate from the concentrated syrup, concentrating the resulting clarified syrup to a substantially higher concentration than that at which the separation of the calcium sulfate was made, and subjecting the resulting additionally concentrated syrup to treatment to cause production of a solid starch conversion product without separation of calcium sulfate subsequent to the additional concentration. The invention includes, in addition, the crystallizing of dextrose at temperatures substantially below the temperature of separation of precipitated calcium sulfate, so that calcium sulfate does not precipitate during the crystallization of the dextrose.

The extent of the conversion to be effected in the sulfuric acid treatment of the original starch suspension is varied according to the product that it is desired to make. If dextrose is to be crystallized, the conversion should be high, say, to about 90 to 92% D. E. or somewhat higher. For 70 sugar or syrup, the conversion may be considerably lower. Such conversion products obviously contain a large proportion of reducing sugar.

After the conversion is made, a small amount of bentonite is introduced in finely divided form and agitated vigorously with the starch conversion liquor.

The bentonite so incorporated becomes associated with certain impurities that, unless removed, would be subject to decomposition as the conversion liquor is evaporated and the sulfuric acid concentration is increased. The mechanism by which the bentonite removes such materials is described herein as adsorption, this term including coagulation, precipitation, adsorption in the strict sense, or other mode of association of the impurities with the bentonite, so long as the impurities are retained with the bentonite when the latter is separated.

Regardless of the detailed explanation of the cause of the functioning of the bentonite, the bentonite is settled, after vigorous agitation with the liquor and subsequent discontinuance of the agitation. A relatively clear supernatant liquid remains. The settled material is then separated, as by filtration, to give a clarified and partially purified starch conversion liquor.

This liquor is then subjected to quick evaporation to remove water and raise the density of the syrup to approximately that desired for the production of a solid product, as, for example, to about 37° Bé. The evaporation is effected to advantage in a long tube, stainless steel evaporator or any other flash evaporator equipment of acid-resisting material. Contrary to previous understanding, we are able in this manner to effect the desired concentration in the presence of the conversion acid, without the development of objectionable taste or color in the presence of the un-neutralized acid, in spite of the fact that the acid concentration increases greatly as the evaporation of water proceeds.

After the concentration to the desired extent has been effected, lime is added to cause coagulation of remaining lime-coagulable materials and precipitation in the form of calcium sulfate of most of the sulfate radical present.

The composition, including the coagulated materials and precipitated calcium sulfate, is then subjected to treatment to cause separation of the solid materials present. Thus, the composition may be filtered, suitably at a temperature near the final temperature of concentration of the syrup.

The clarified and concentrated syrup may be subjected next to decolorizing, as by the incorporation of decolorizing carbon in usual manner and filtering the mixture to remove carbon and retained coloring materials, after the carbon has been for some time in contact with the syrup that is to be decolorized. In case bleaching is not desired the decolorizing step is omitted.

The syrup is then subjected to treatment to cause the formation of a solid starch conversion product. For this operation the syrup may be subjected to cooling in shallow pans, to form a solidified mass, or may be cooled in dextrose crystallizers of usual kind and with usual technique, to form a massecuite of dextrose crystals and molasses from which the crystals are separated by centrifuging and washing.

It is preferable, however, to resume the concentration by evaporation after the separation of the calcium sulfate and before the cooling to produce a solid product. Thus, the clarified syrup, after decolorization, if that step is included in the process, is further concentrated in a usual type of vacuum evaporator to a density of 39 to 43 Bé. or some other density substantially above that at which the calcium sulfate was previously separated. The cooling is then effected as described. Calcium sulfate that is deposited during this additional concentration and charged in undissolved condition to freezing pans or dextrose crystallizers redissolves during the ensuing cooling, partly because of the increased solubility of calcium sulfate at low temperatures and because of the continuously decreasing proportion of dissolved starch conversion products in the remaining aqueous phase. It has been found, however, that no appreciable amount of the sulfate separates during this additional concentration to 39 to 43° Bé., the decolorizing subsequent to the filtration at 37° Bé. having evidently removed some of the calcium sulfate by adsorption on the decolorizer, the decolorizing and the filtration at 37° Bé. being conducted suitably at temperatures of about 125 to 175° F.

If dextrose has been crystallized, the mother liquor or molasses from the crystallization is reconverted and processed in the cycle of steps described, beginning with the conversion in the presence of sulfuric acid and concluding with the crystallization of a second dextrose fraction and separation of a second molasses.

Likewise, the second molasses is reconverted and processed as described to give a third dextrose and a third molasses.

We have found that the time required for the crystallization of the second and third dextroses does not increase very greatly over the time required for the crystallization of the first crop of dextrose crystals, this being due presumably to the non-accumulation in large proportions of inorganic salt that if present interferes with conversion and crystallization. Thus, the first crystallization requires about 4 to 6 days' time, the second crystallization about the same time, and the third crystallization only about 5 to 7 days, as compared with 20 to 30 days for the usual third dextrose crystallization in the conventional process. Furthermore, the ash content of our first massecuite (including dextrose crystals and molasses) is about 0.10 to 0.15, of the second about 0.4 to 0.5, and of the third about 1.2 to 1.4%. The centrifuged, washed and dried first dextrose contains only about 0.004% ash, or about a tenth of that present in usual commercial dextrose heretofore made.

The great improvement in ash content of our materials as compared to usual materials at the corresponding stages of processing will be evident from a comparison of the following data for typical runs:

| Dextrose massecuite | Ash content, per cent | |
|---|---|---|
| | Our process | Hydrochloric acid conversion process |
| First | 0.1 to 0.15 | 1.0 to 1.2 |
| Second | 0.4 to 0.5 | 2.4 to 2.8 |
| Third | 1.2 to 1.4 | 7.0 to 8.0 |

Conditions of conversion and subsequent refining are usual unless otherwise stated. Thus, the proportion of starch which is suspended in water for the initial conversion may vary within the conventional range.

A more specific example of the practice of the invention follows:

A batch of 2,058 gallons of a starch suspension in water, of specific gravity 10.5 Bé., was converted with 38 pounds of sulfuric acid, the pH of the conversion mixture being approximately 1.7. The conversion was effected by heating for 28 minutes at a steam pressure of 45 pounds gauge. The resulting starch conversion liquor had a dextrose equivalent of 91.5 to 93%.

To this conversion liquor there was added 20 pounds of finely divided bentonite and the added bentonite agitated violently in the liquor until the distribution of the bentonite was substantially uniform. The resulting mixture was then allowed to stand without agitation for a few minutes, so that the bentonite and materials adsorbed thereon settled out. The batch was then filtered, the supernatant liquor being passed first through the filter and the settled material being then transferred to the filter.

The resulting clear filtrate was then evaporated in a long tube, stainless steel evaporator to 38° Bé., without neutralization of acidity present.

To the resulting concentrated syrup there was then added sufficient calcium hydroxide, in the form of a heavy slurry with water to raise the pH to 4.8, give precipitation of small amounts of fats and proteins not previously removed by the bentonite, and cause precipitation of a considerable quantity of calcium sulfate. The coagulated and precipitated materials were separated by filtration.

To the filtrate there was added commercial bleaching carbon in finely divided form and in amount equal approximately to 1% of the weight of the conversion products present on the dry basis, this requiring about 40 pounds of the bleaching carbon. The bleaching was repeated three times, with separation of the added carbon between each treatment.

The bleached liquor finally obtained had a color corresponding to 3.5 Br. in a one-inch cell, a color that is very satisfactory and comparable to the best obtained by the direct bleaching of light liquor in usual commercial practice.

The bleached liquor was then concentrated to 37.5 to 39 Bé. in a vacuum pan of usual construction and the resulting concentrated syrup subjected to dextrose crystallization in the usual manner. The crystallized dextrose was centrifuged from the molasses, washed in the centrifuge with water, and dried, all in conventional manner.

The crystallized dextrose so obtained showed practically no separation of calcium sulfate during crystallization and had an ash content of 0.004%. In a 20% solution in water the dextrose was crystal clear.

The yield of dextrose in the first crystallization varied in different runs from 60 to 65% of the theory.

The mother liquor from the first dextrose was reconverted with sulfuric acid and subsequently processed as described above and concentrated to 39.5 Bé. The ash content of the concentrated syrup on the dry basis was 0.45% and the purity 92. In crystallizing dextrose from the concentrated syrup, there was required only 5 days and 4 hours. The yield of dextrose was 55 to 60 parts for 100 parts of the massecuite.

The mother liquor was separated from the second dextrose, reconverted, processed and concentrated as above. The ash content of the concentrated syrup of 39.5 Bé. was 1.27% on the dry basis and the D. E. 90%. Crystallization of dextrose required 6 days and the yield was 60 parts of dextrose for 100 parts of the massecuite.

It is evident that the present method makes possible the production of dextrose or solidified concentrated syrup of abnormally low ash content. In case dextrose is to be crystallized, there is also an important shortening of the time required in crystallization of the second and third dextrose fractions, satisfactory yields of dextrose, and a minimum of interference from the inorganic salt content with the reconversion of the molasses separated from the dextrose crystals.

While the invention has been illustrated by description in connection with the use of bentonite as the adsorber, other adsorbers adapted to resist acid for a short period of time may be used, so long as they have the general properties stated above. Colloidal clay, certain colloidal aluminates, or the like may be used in place of bentonite. Also, the adsorber may be added to the aqueous starch suspension before conversion of the starch, although the addition of the adsorber after the conversion has certain advantages.

Although the invention is particularly useful in the treatment of corn starch, other starches may be substituted pound for pound for corn starch. Among such starches that may be used are wheat, potato, and tapioca starch, in the refining of which by a process including conversion the presence of a large proportion of ash is seriously objectionable. The degree of conversion of the starch to be effected before the evaporation is begun is preferably somewhat less than that desired in the finished product, to allow for the limited additional conversion that is effected during evaporation.

It will be understood that the details given are for the purpose of illustration and that variations within the spirit of the invention are intended to be included within the scope of the appended claims.

What we claim is:

1. In making a starch conversion product containing a large proportion of reducing sugar and having an abnormally low ash content, the method which comprises forming a suspension of starch, water, and sulfuric acid dissolved in the water for effecting conversion, heating the suspension at a temperature corresponding to steam at superatmospheric pressure to form starch conversion liquor, treating the resulting liquor with an adsorbent adapted to cause coagulation of coagulable materials present, separating the adsorbent and associated material, then heating the said liquor to produce evaporation and cause concentration of the liquor to a syrup adapted on cooling to give a solid starch conversion product, then adding lime to neutralize sulfuric acid and precipitate calcium sulfate, separating the precipitated calcium sulfate from the syrup after said concentration, and cooling the syrup after separation from the calcium sulfate to cause crystallization of a solid starch conversion product, the crystallization being effected at a temperature substantially below the temperature of said separating of the calcium sulfate, so as to avoid crystallization of calcium sulfate subsequent to the separating of calcium sulfate.

2. The method described in claim 1 which includes effecting the said evaporation to the concentrated syrup quickly and before the lime is added to neutralize the sulfuric acid.

3. In making a starch conversion product, the method which comprises converting starch by heating the starch in water containing sulfuric acid for effecting the conversion, until there is produced a conversion liquor containing a large proportion of reducing sugar, mixing bentonite into the acid-containing conversion liquor so as to coagulate bentonite-coagulable materials, separating the remaining solution from the bentonite and the materials coagulated thereby, quickly evaporating water from the separated solution before the acidity is neutralized, to give a concentrated syrup of desired density with a minimum time period allowed for objectionable side reactions in the presence of the sulphuric acid of concentration continually increasing as the evaporation proceeds, then neutralizing acidity in the concentrated syrup with lime, and separating the resulting precipitate including calcium sulfate, to produce a clarified syrup of abnormally low ash content.

4. In making a starch conversion product, the method which comprises converting starch by heating the starch in water containing sulfuric acid for effecting conversion, until there is produced a conversion liquor containing a large proportion of reducing sugar, mixing bentonite intimately into the resulting starch conversion liquor so as to adsorb materials subject to decomposition on continued heating with sulfuric acid at concentrations substantially in excess of the concentration of acid in the conversion liquor, separating the remaining solution from the bentonite and adsorbed materials, quickly evaporating water from the separated solution, before the acidity is neutralized, to give a concentrated syrup of desired density, neutralizing acidity in the concentrated syrup with lime, separating the resulting precipitate including calcium sulfate, and cooling the clarified syrup to cause formation of a solid starch conversion product of abnormally low ash content.

5. In making a starch conversion product of low ash content, the method which comprises converting an aqueous starch suspension with sulfuric acid to a starch conversion liquor containing a substantial proportion of reducing sugar, adding bentonite to the resulting acid-containing starch conversion liquor, separating the added bentonite and the material associated therewith, then decolorizing and evaporating the resulting conversion liquor to a syrup of density of about 37° Bé., neutralizing the acidity in the syrup with lime, separating the resulting precipitate of calcium sulfate by filtration of the syrup at a density of about 37° Bé., decolorizing the filtrate from the calcium sulfate by contact with decolorizing carbon, and further concentrating the decolorized filtrate by evaporation, to form a substantially clear concentrated syrup.

6. The method described in claim 5, the neutralization of the acidity in the syrup with lime being effected after the concentration to a density of about 37° Bé.

HERMAN H. SCHOPMEYER.
ABRAHAM H. GOODMAN.